United States Patent
Karam

(10) Patent No.: US 8,020,043 B2
(45) Date of Patent: Sep. 13, 2011

(54) FIELD FAILURE DATA COLLECTION

(75) Inventor: Roger Karam, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 271 days.

(21) Appl. No.: 12/399,500

(22) Filed: Mar. 6, 2009

(65) Prior Publication Data
US 2010/0229048 A1    Sep. 9, 2010

(51) Int. Cl.
G06F 11/00 (2006.01)
(52) U.S. Cl. .......................................... 714/22; 714/47.1
(58) Field of Classification Search .................... 714/14, 714/22, 47, 48
See application file for complete search history.

(56) References Cited

U.S. PATENT DOCUMENTS

| | | | |
|---|---|---|---|
| 6,282,674 B1 * | 8/2001 | Patel et al. | 714/30 |
| 6,823,375 B2 * | 11/2004 | Lee et al. | 709/220 |
| 7,080,285 B2 * | 7/2006 | Kosugi et al. | 714/36 |
| 2005/0144533 A1 * | 6/2005 | LeVangia et al. | 714/43 |
| 2006/0059390 A1 * | 3/2006 | Duron et al. | 714/43 |
| 2006/0156054 A1 * | 7/2006 | Brown et al. | 714/4 |
| 2006/0212752 A1 * | 9/2006 | Mechalke et al. | 714/7 |
| 2006/0242458 A1 * | 10/2006 | Feldman et al. | 714/14 |
| 2007/0011547 A1 * | 1/2007 | Karam | 714/746 |
| 2008/0005626 A1 * | 1/2008 | Schaff et al. | 714/48 |
| 2009/0006902 A1 * | 1/2009 | Corcoran et al. | 714/48 |
| 2009/0217088 A1 * | 8/2009 | Diab | 714/14 |
| 2009/0249112 A1 * | 10/2009 | Diab | 714/2 |
| 2010/0095136 A1 * | 4/2010 | Karam | 713/300 |
| 2010/0325484 A1 * | 12/2010 | Suzuki et al. | 714/14 |

* cited by examiner

*Primary Examiner* — Marc Duncan
(74) *Attorney, Agent, or Firm* — BainwoodHuang

(57) ABSTRACT

The operation of a powered device is monitored to detect a failure condition, the powered device connected to power sourcing equipment by a communications channel including inline power delivery from the power sourcing equipment to the powered device. Diagnostic information is captured including (i) configuration and status information identifying the power sourcing equipment, the communications channel, and status of the inline power delivery at the time of detection of the failure condition, and (ii) failure information identifying the failure condition. This diagnostic information is stored as diagnostic information signals in an electronic memory which is electronically accessible by an external user as part of a failure analysis process. By this process, diagnostic information pertaining to the operation of the powered device with the power sourcing equipment and the communications channel is captured and stored, providing greater information for more thorough failure analysis.

15 Claims, 2 Drawing Sheets

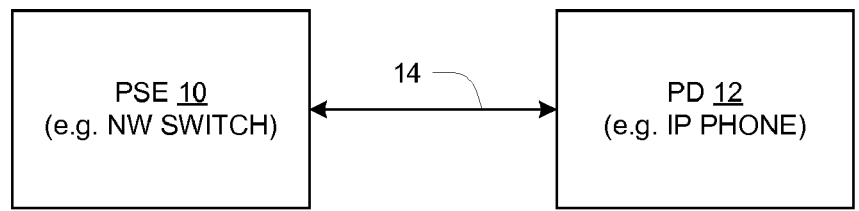
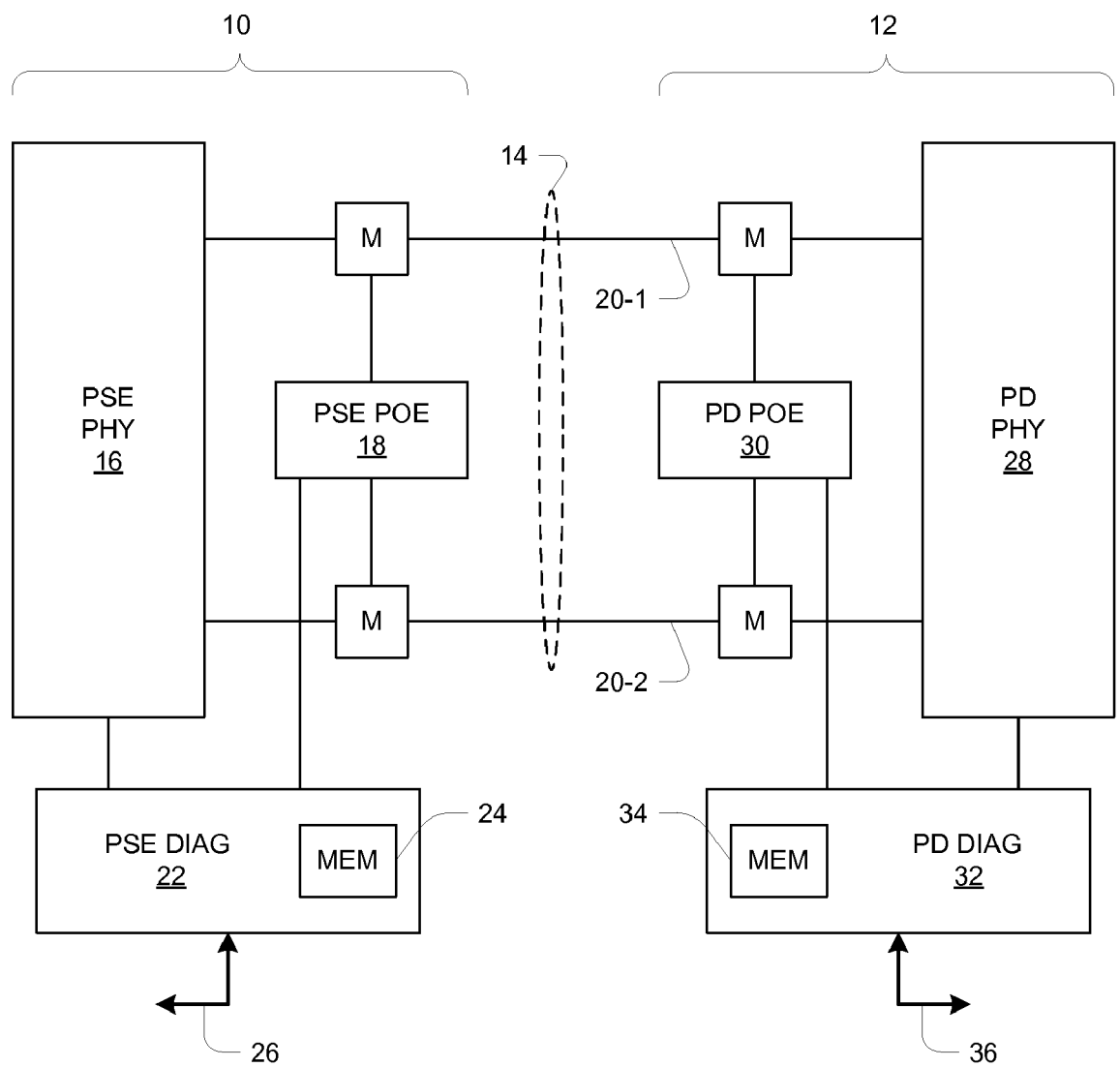

FIELD FAILURE DATA COLLECTION

BACKGROUND

Powered communications interfaces are utilized in data communications systems to provide operating power to devices over the same wires used to carry data communications signals, in a manner analogous to the traditional telephone system in which DC operating power is provided to subscriber equipment over the twisted-pair telephone wires. Today, there is widespread use of so-called "power over Ethernet" or POE technology, in which DC operating power is provided to digital telephones, video cameras, and other data terminal equipment over unshielded twisted pair (UTP) cables connecting the data equipment with centralized data switches. In POE parlance, a device receiving power in this fashion is termed a "powered device" or PD, while a device that provides power for use by PDs is termed a "power sourcing equipment" or PSE. This method of power delivery is also referred to as "inline power delivery".

BRIEF DESCRIPTION OF THE DRAWINGS

Objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 1 is a block diagram of system including a power sourcing equipment and a powered device;

FIG. 2 is a block diagram of the system of FIG. 1 showing details of the power sourcing equipment and powered device.

DETAILED DESCRIPTION

Overview

Figure 3:
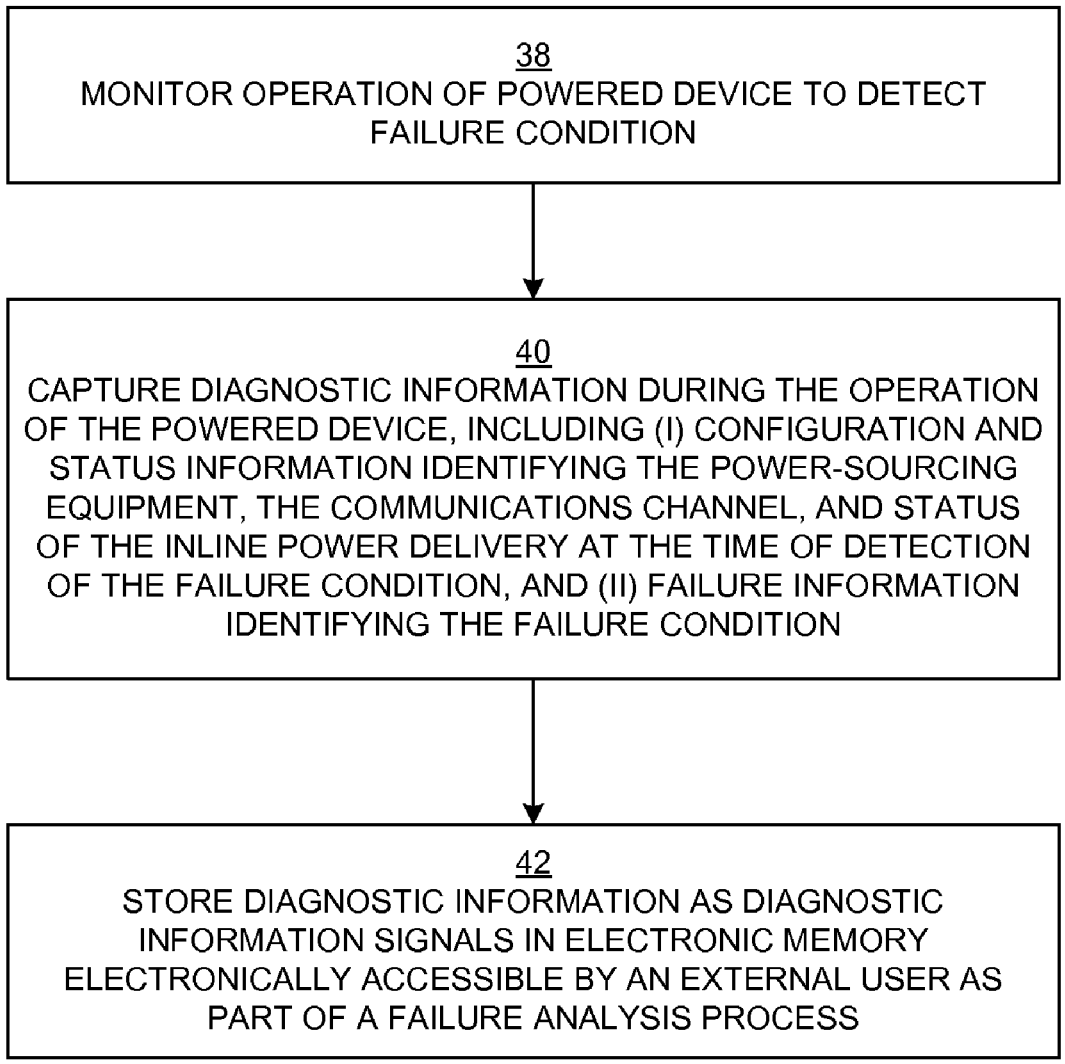
FIG. 3 is a flow diagram illustrating operation of the system of FIGS. 1 and 2.

As in all systems, the components in systems employing inline power delivery are subject to failures during regular operation in the field. Because of the complexity of the components (e.g. an IP telephone or similar PD), many different types of failure conditions can occur. It can be important to accurately diagnose field failures for a variety of purposes, such as providing feedback to product design/support activities or to customers for proper installation and use of products. Although individual components commonly include self diagnostics, these may be limited to identifying and diagnosing primarily internal failure conditions. However, there are many other failure conditions that involve the interaction among components in the system, and it would be desirable to capture information about these kinds of failure conditions to improve the diagnosing and correcting of these kinds of failures.

The disclosed methods and apparatus include monitoring operation of a powered device to detect a failure condition, the powered device being connected to power sourcing equipment by a communications channel including inline power delivery from the power sourcing equipment to the powered device. Diagnostic information is captured during the operation of the powered device, the diagnostic information including (i) configuration and status information identifying the power sourcing equipment, the communications channel, and status of the inline power delivery at the time of detection of the failure condition, and (ii) failure information identifying the failure condition. This diagnostic information is stored as diagnostic information signals in an electronic memory which is electronically accessible by an external user as part of a failure analysis process. By this process, diagnostic information pertaining to the operation of the powered device with the power sourcing equipment and the communications channel can be captured and stored, providing greater information for more thorough failure analysis.

Description of Example Embodiments

FIG. 1 shows a system including a power sourcing equipment (PSE) 10 connected to a powered device (PD) 12 by a cable 14. In one embodiment the PSE 10 is a network switch (NW SWITCH), the PD 12 is an Internet Protocol (IP) telephone (IP PHONE) and the cable 14 is unshielded-twisted-pair (UTP) cable such as known by the term "category 5" or "category 6" for example.

FIG. 2 shows relevant details of the PSE 10, PD 12 and cable 14. The PSE 10 includes so-called "physical layer" (PHY) circuitry (PSE PHY) 16, PSE power-over-Ethernet (POE) circuitry (PSE POE) 18, and magnetics M that couple both the PSE PHY circuitry 16 and PSE POE circuitry 18 to the cable 14. In particular, in the configuration of FIG. 2 the magnetics M couple to two pairs 20-1, 20-2 of the cable 14. The PSE 10 also includes PSE diagnostic circuitry (PSE DIAG) 22 having connections to the PSE PHY circuitry 16 and PSE POE circuitry 18. The PSE diagnostic circuitry 22 includes memory (MEM) 24 for storing diagnostic information and may also include a channel 26 for electronically transferring stored diagnostic information from the memory 24 to an external device/system used for higher-level diagnostic monitoring and/or failure analysis, as described in more detail below.

As also shown in FIG. 2, the PD 12 includes PD PHY circuitry (PD PHY) 28, PD POE circuitry (PD POE) 30, and magnetics M that couple both the PD PHY circuitry 28 and PD POE circuitry 30 to the pairs 20-1, 20-2 of the cable 14. The PD 12 also includes PD diagnostic circuitry (PD DIAG) 32 having connections to the PD PHY circuitry 28 and PD POE circuitry 30. The PD diagnostic circuitry 32 includes memory (MEM) 34 for storing diagnostic information and may also include a channel 36 for electronically transferring stored diagnostic information from the memory 34 to an external device/system used for higher-level diagnostic monitoring and/or failure analysis, as described in more detail below.

Briefly, there are two general operation aspects to the system of FIG. 2. The major functionality includes the exchange of data between the PSE 10 and PD 12 in the form of network data packets. The PHY circuitry 16 and 28 performs lower-level activities pertaining to packet transfer (primarily high-speed electrical signaling). The POE circuitry 18, 30 provides for the delivery of inline DC power from the PSE 10 to the PD 12 via the conductors 20, which frees the PD from the need to receive power from some other external source. In the case of an IP video camera, for example, the camera can be mounted in a location without regard to whether any AC wall outlet is nearby (such as outdoors on a light pole or fence). In operation, the POE circuitry 18, 30 first engages in a "discovery" process by which the PSE 10 detects the presence of a valid PD 12, which is followed by the application of DC power (nominally 48 volts) from the PSE 10 to the PD 12 via the conductors 20.

FIG. 3 describes an additional aspect of operations directed at failure detection and reporting in a system such as the system of FIGS. 1 and 2. It should be noted that the process may be performed predominantly by the PSE 10, predominantly by the PD 12, or by both the PSE 10 and PD 12. Within the PSE 10 and PD 12, operations are performed by the respective diagnostic circuitry 22 or 32 in conjunction with the respective PHY and/or POE circuitry 16/18 or 28/30. The various modes/aspects of these operations may be better understood by reference to specific examples discussed below.

Referring to FIG. 3, at step 38 the operation of the PD 12 is monitored in order to detect a failure condition thereof. Various general classes and specific types of failure conditions may be monitored for and detected, as described below, and as indicated above the monitoring may be conducted by the PSE 10 and/or the PD 12. At step 40, diagnostic information is captured which includes (i) configuration and status information which identifies, at a minimum, the PSE 10, the communications channel which connects the PSE 10 and PD 12 (i.e., a port number of a physical port on the PSE 10 to which the cable 14 is connected), and the status of the inline power delivery at the time the failure condition is detected (e.g., whether or not power is being delivered from the PSE 10 to the PD 12 via the pairs 20 of the cable 14). Additionally, the captured diagnostic information includes (ii) failure information which identifies the failure condition that has been detected. Again, several specific examples are provided below. Generally, the failure information identifies some condition that is considered abnormal, for example the failure to detect the presence of 48 volt inline power at the PD 12 even though such inline power is being supplied to the cable 14 by the PSE 10, or the failure to receive Ethernet communications packets from the PD 12 at the PSE 10 even though the communications link(s) carried by the pairs 20 of the cable 14 appear(s) to the PSE 10 as correctly connected and initialized.

At step 42, the diagnostic information that is captured at step 40 is stored as diagnostic information signals in an electronic memory that is electronically accessible by an external user as part of a failure analysis process. In one class of embodiments, the diagnostic information is stored in a nonvolatile manner in the memory 34 of the PD 12, and the external user accesses the memory 34 (e.g. via the channel 36). To the extent that the PSE 10 is involved in capturing the diagnostic information (discussed more below), the PSE 10 communicates the captured diagnostic information to the PD 12 for storage in the memory 34. This communication may be effected via the cable 14, including at the PHY level (packet-based communications if available) and/or the POE level (modulation of POE signals to carry low-rate information signals carrying the diagnostic information and commands to store it in the memory 34). The communication includes the diagnostic information itself as well as a command to the PD 12 to store the diagnostic information in the electronic memory 34.

In the case that the PD 12 is a field-replaceable electronic module (such as an IP phone, IP camera or similar field-replaceable item), the memory 34 can be interrogated by the external user at a repair center to which the failed PD 12 may be sent. The channel 36 may include a dedicated connection between the memory 34 and a connector of a printed circuit board on which the memory 34 resides, for example, such connector accepting a connection to test equipment of the external user. Alternatively the channel 36 may include wireless communications circuitry including radio-frequency identification (RFID) circuitry. It will be seen that the presence of the diagnostic information in the memory 34 may be quite helpful in diagnosing the failure or at least helping to characterize the failure for any of a variety of purposes. Also, the interface connector where the magnetic components reside may be used to retrieve the diagnostic data stored in memory all without the need to open the enclosure of the PD.

As either an alternative or in conjunction with storing the diagnostic information in the memory 34, the diagnostic information may also be stored in the memory 24 of the PSE 10, and then provided to an external user via the channel 26. In this case it is assumed that the PSE 10 is not a field-replaceable unit. In one embodiment the channel 26 may simply be a network path to a network management station to which the diagnostic information is reported in the form of data packets etc. Alternatively the channel 26 may include a specialized dedicated path within the PSE 10 including an exterior connector to which an external device can be connected for maintenance activities.

As mentioned, in one class of embodiments the PSE 10 conducts both the monitoring and capturing steps 38 and 40 of the process of FIG. 2, and at least part of the storing operation 42 as well. In such embodiments the PD 12 may also perform some of its own monitoring and capturing of additional diagnostic information, which can also be stored in memory (e.g. memory 34) and subsequently provided to the external user for failure analysis.

Types of Failure Information and Information Capturing

Generally, the failure information that is captured describes the type of problem encountered and identifies the device(s) having the problem. No attempt is made here to provide an exhaustive list of all potential failures and respective failure information. However, some general categories and specific examples are provided, these being useful of themselves as well as illustrative of other types of failures and information that can be monitored for, captured and stored.

General categories include the following:
1. Power-related (including POE-related)
2. Data-related (including PHY-based communications for example)
3. Cable/connection related (discontinuities, shorts, etc.)
4. Other The power-related category may include POE-related failures as well as failures associated with a power supply local to the PD 12, such as a wall-connected AC-DC converter of the type commonly referred to as a "brick". Additionally, detection of excessive voltages or currents are included in this category, such as might be caused by a lightning strike or electrostatic discharge (ESD) or power system malfunctions. One type of POE malfunction information that may be useful is information indicating that a PD never detected any POE voltages at all, a sign that it was not plugged in properly and thus may have been returned for repair because of confusion. An example of a data-related failure is the failure to receive data packets at the PSE 10 from the PD 12 (or vice-versa). Data related might also include the detection of data errors such as can be caused by external RF interference. Examples of "other" include various hardware failures such as failures of application-specific circuits (ASICs) for various functions, failure of display driver circuitry or memory chips, etc.

For purposes of detecting power-related failure conditions, either/both of the PSE diagnostic circuitry 22 and PD diagnostic circuitry 32 measure the DC power signals (both voltages and currents) appearing along the path between the PSE 10 and PD 12 (e.g., on the conductors 20 or at the PSE POE 18 or PD POE 30) and compare the measured signals to templates of expected signals to troubleshoot or detect a deficiency. It should be noted that other on-board, system measurements may be done for other purposes, but the primary goal of the disclosed technique is to detect and report problems that a device (e.g. PD 12) is not capable of detecting on its own without external help. Also note that this technique may be deployed to troubleshoot such problems in manufacturing. The monitoring and capturing of diagnostic information can be initiated in certain predefined circumstances, such as at various points in a power-up or initialization sequence, or upon occurrence of an erroneous operating condition, or they might be user-initiated such as via a button or a control in a graphical user interface.

The following are specific examples of power-related problems for which monitoring and capturing of diagnostic information can be performed:

1. PSE measuring POE discovery resistance and classification power of PD (PD input impedance) before power is applied.
2. PSE measuring 48 volt power supplied to PD and detecting unexpectedly high or low power consumption
3. PSE monitoring for unusual fluctuation in power supplied to PD The PD 12 can monitor the levels and other characteristics of the discovery and classification signals from the PSE 10 before the 48v power is applied, this information being useful to identify whether the PSE 10 is operating in compliance with the POE standards. The PD 12 can also measure the voltage level of the 48v power signal from the PSE 10 to determine whether it is within its allowed range, and it can apply similar monitoring to any auxiliary power source (e.g. brick) that might be present. If the cable 14 has excessive DC voltage drop, this condition can be detected in the PD 12. The PD PHY 28 can measure the cable 14 AC-wise and the PD POE 30 can measure the cable 14 DC-wise (measuring input power at both ends), and the presence of a mismatch between a pair's PHY length measurements versus the DC resistance of the POE indicates a lossy cable. So effectively various cable problems can be measured using POE, such as a short in one pair, among pairs, excessive DC resistance, a cut cable (e.g. one wire in a pair is cut or a pair is cut), or an increase in contact resistance over time.

To store the diagnostic information for POE related problems when the POE power does not come up, it may be desirable to use communication techniques employing modulation of POE detection and classification signals such as described in U.S. patent application Ser. No. 12/268,560 entitled POWERED COMMUNICATIONS INTERFACE PROVIDING LOW-SPEED COMMUNICATIONS BETWEEN POWER-SOURCING EQUIPMENT AND POWERED DEVICE IN NON-POWERED OPERATING MODE, this information being incorporated by reference herein. Alternatively, if POE power is applied, then it may be desirable to employ a communications technique employing modulation of POE power signals such as described in U.S. patent application Ser. No. 10/961,904 entitled INLINE POWER-BASED COMMON MODE COMMUNICATIONS IN A WIRED DATA TELECOMMUNICATIONS NETWORK (Patent Application Publication US 2006/0082220 A1), also incorporated by reference herein. If available, regular PHY-based communications (packet-based) may also be used. It may be desirable to select an appropriate communications protocol after a judgment is made about what the failure may be, or alternative to simply attempt to store the data using both POE and PHY communications mechanisms. In this sense, the use of modulated power signals can be viewed as a POE-based first communications mechanism serving as a backup to a PHY-based second communications mechanism which is a primary communications mechanism between the power sourcing equipment and the powered device, wherein the first communications mechanism is utilized when the primary communications mechanism is not available for use.

Regarding data-related failure conditions and failure information, the following are examples of such items:

Cable length, PHY-based TDR measurements
Quality of PHY signals
Presence of data/packet errors indicating possible external interference
Presence of transient and excessive voltages and currents
Cable plug/unplug events
Broken wires/pairs in cable without cable unplugs
Intermittent changes in cable impedance It may be desirable to exchange information between the PSE 10 and PD 12 of the nature of the signals detected on each end. Also, there could be use of special signals to help ease troubleshooting. These could be the Ethernet signals or other signals more specifically tailored for such use.

To store the diagnostic information about these failure conditions using the PHY (PSE PHY 16 and PD PHY 28), the PHY can be powered and packets can be exchanged at any speed that works. Normally 10BaseT communications are pretty robust, and such communications may be used if available. It may be desirable to use an alternative communications scheme that utilizes only one pair 20 if one or multiple pairs 20 in the cable 14 are broken.

If the PHY is not fully powered, it may be desirable to use data-like signals sent by the PSE 10 as low power generation signaling, in conjunction with a local memory inside or outside the PD PHY circuitry 16. An initial burst of low-voltage AC signals can be used to pump charge into a chargeable power storage device such as a capacitor, then the stored power can be used to power the PD PHY circuitry 16 and the memory to store the diagnostic information conveyed by subsequent signals. Note that the diagnostic information stored in the memory 34 is preferably read by RFID or by plugging a cable of some sort, so the PD 12 need not be opened. An example of the use of low-power signals to provide operating power is described in PCT application no. PCT/US2006/033664 entitled LOW-POWER ETHERNET DEVICE and published Mar. 8, 2007 as WO2007/027673A2, the contents of which are incorporated by reference herein. This would also be valuable in a system where two PSE devices are attached.

The pairs 20 of the cable 14 can be tested using data and time-domain reflectometry (TDR) signals.

Additionally, higher level data checking may be utilized. Here packets are sent from one device to another (e.g. PSE 10 to PD 12) and various aspects may be recorded, such as packet type, length and data content as well as which packets are successfully delivered and which are not. This way it is possible to troubleshoot the digital side of the switch/PSE 10 across the multiple devices attached to a port or ports being tested. Basically this a loopback of data across multiple devices using either a regular data channel or a modified data channel (e.g., regular Ethernet, RF, POE communications channel, modified Ethernet such as single-pair communication, or some combination of the above). Such a process can inform attached devices about a problem in the switch fabric or digital side of a device (PSE 10 or PD 12) and the location of the problem. Then on-board self diagnostic routines can be executed or remotely initiated and lower-level details can be obtained on the local problem and shared with other devices as necessary/desired.

The following are examples of configuration/status information that can be captured as well, to provide additional information for failure analysis:

Identification(s) of all device(s) attached (model names and serial numbers, e.g.)
Identification of channel(s) (e.g., port number(s))
Operating temperatures
Changes in cable characteristics
Time to failure
Whether device has ever received any signals (data and inline power)

Redundant data and power can be deployed to troubleshoot the problem and collect more information. Additionally, if a device is attached to the phone by a wired channel but has RF PHY circuitry, it may be desirable to communicate with such a device via RF to troubleshoot the wired connection and vice versa. While a 2 pair interface is shown above, similar methodology applies to multiple pairs in a single cable, multiple devices sharing one cable, or even in the wireless and fiber optics channels. Any available communication interface not affected by the failure would be deployed to remotely sense and store diagnostic data, initiate local diagnostic routines, enable user interactions where needed, and share results over the internet in real time when applicable.

While various embodiments of the invention have been particularly shown and described, it will be understood by those skilled in the art that various changes in form and details may be made therein without departing from the spirit and scope of the invention as defined by the appended claims.

What is claimed is:

1. A method, comprising:
monitoring operation of a powered device to detect a failure condition, the powered device being connected to power sourcing equipment by a communications channel including inline power delivery from the power sourcing equipment to the powered device;
capturing diagnostic information during system operation, the diagnostic information including (i) configuration and status information identifying the power sourcing equipment, the communications channel, and status of the inline power delivery at the time of detection of the failure condition, and (ii) failure information identifying the failure condition;
storing the diagnostic information as diagnostic information signals in an electronic memory, the electronic memory being electronically accessible by an external user as part of a failure analysis process,
wherein the method is performed at least in part by the power sourcing equipment, and the monitoring includes monitoring at least one of power-related signals and data-related signals from the powered device on the communications channel,
and wherein:
the electronic memory is located on the powered device; and
the storing includes transferring the diagnostic information from the power sourcing equipment to the powered device for storage in the electronic memory.

2. A method according to claim 1, wherein the monitoring further includes measuring electrical characteristics of a cable carrying the communications channel.

3. A method according to claim 1, also performed in part by the powered device.

4. A method according to claim 1, wherein the transferring is performed over the communications channel using power signals modulated at a low data rate substantially lower than a higher data rate used for normal operation communications between the power sourcing equipment and the powered device on the communications channel.

5. A method according to claim 4, wherein the transferring is preceded by sending a stream of low-level signals from the power sourcing equipment onto the communications channel that are used by the powered device to charge a chargeable power storage device used to power the electronic memory during the storing of the diagnostic information.

6. A method according to claim 4, wherein the use of the modulated power signals is a first communications mechanism serving as a backup to a distinct second communications mechanism serving as a primary communications mechanism between the power sourcing equipment and the powered device, the first communications mechanism when the primary communications mechanism is not available for use.

7. A power sourcing equipment, comprising:
physical-layer circuitry operative to generate and respond to physical-layer communications signals to be delivered to and received from a communications channel;
power-over-Ethernet circuitry operative to generate inline power for use by a powered device to be coupled to the communications channel;
magnetics coupling the physical-layer circuitry and the power-over-Ethernet circuitry to conductor pairs of the communications channel; and
diagnostic circuitry coupled to the physical-layer circuitry and the power-over-Ethernet circuitry, the diagnostic circuitry being operative to control operation of one or both of the physical-layer circuitry and the power-over-Ethernet circuitry to:
(1) monitor operation of the powered device via the communications channel to detect a failure condition;
(2) capture diagnostic information during the operation of the powered device, the diagnostic information including (i) configuration and status information identifying the power sourcing equipment, the communications channel, and status of inline power delivery from the power sourcing equipment to the powered device at the time of detection of the failure condition, and (ii) failure information identifying the failure condition; and
(3) store the diagnostic information as diagnostic information signals in an electronic memory, the electronic memory being electronically accessible by an external user as part of a failure analysis process,
wherein the monitoring includes monitoring at least one of power-related signals and data-related signals from the powered device on the communications channel,
and wherein:
the electronic memory is located on the powered device; and
the storing includes transferring the diagnostic information from the power sourcing equipment to the powered device for storage in the electronic memory.

8. A power sourcing equipment according to claim 7, wherein the diagnostic circuitry is operative in conjunction with the power-over-Ethernet circuitry to transfer the diagnostic information over the communications channel using power signals modulated at a low data rate substantially lower than a higher data rate used by the physical-layer circuitry for normal operation communications between the power sourcing equipment and the powered device on the communications channel.

9. A power sourcing equipment according to claim 8, wherein the diagnostic circuitry is operative in conjunction with the physical-layer circuitry preceding the transfer of the diagnostic information to send a stream of low-level signals from the power sourcing equipment onto the communications channel that are used by the powered device to charge a chargeable power storage device used to power the electronic memory during the storing of the diagnostic information.

10. A power sourcing equipment according to claim 8, wherein the use of the modulated power signals is a first communications mechanism serving as a backup to a distinct second communications mechanism serving as a primary communications mechanism between the power sourcing equipment and the powered device, the primary communications mechanism being effected by the physical-layer circuitry, the first communications mechanism being utilized when the primary communications mechanism is not available for use.

11. A powered device, comprising:
   physical-layer circuitry operative to generate and respond to physical-layer communications signals to be delivered to and received from a communications channel;
   power-over-Ethernet circuitry operative to receive inline power from a power sourcing equipment to be coupled to the communications channel;
   magnetics coupling the physical-layer circuitry and the power-over-Ethernet circuitry to conductor pairs of the communications channel; and
   diagnostic circuitry coupled to the physical-layer circuitry and the power-over-Ethernet circuitry, the diagnostic circuitry including an electronic memory electronically accessible by an external user as part of a failure analysis process and a channel connected to the electronic memory, the channel being distinct from the communications channel;
   wherein operation of the physical-layer circuitry and power-over-Ethernet circuitry with the power sourcing equipment includes inline power delivery from the power sourcing equipment to the powered device and results in the capturing by the power sourcing equipment of diagnostic information including (i) configuration and status information identifying the power sourcing equipment, the communications channel, and status of the inline power delivery at the time of detection of a failure condition, and (ii) failure information identifying the failure condition;
   and wherein the diagnostic circuitry is operative in conjunction with the physical-layer circuitry and the power-over-Ethernet circuitry to:
   receive the diagnostic information from the power sourcing equipment accompanied by a command to store the diagnostic information in the electronic memory;
   store the diagnostic information received from the power sourcing equipment as diagnostic information signals in the electronic memory; and
   subsequently transfer the diagnostic information from the electronic memory to the external user via the channel.

12. A powered device according to claim 11, wherein the diagnostic circuitry is further operative to monitor the operation of the powered device, capture additional diagnostic information based on the monitoring, store the additional diagnostic information in the electronic memory and subsequently transfer the additional diagnostic information from the electronic memory to the external user via the channel.

13. A powered device according to claim 11, wherein diagnostic circuitry is operative with the power-over-Ethernet circuitry to receive the diagnostic information via power signals on the communications channel modulated at a low data rate substantially lower than a higher data rate used for normal operation communications between the power sourcing equipment and the powered device on the communications channel.

14. A powered device according to claim 13, wherein the powered device includes a chargeable power storage device usable to power the electronic memory during the storing of the diagnostic information, and wherein receiving of the diagnostic information is preceded by (1) receiving a stream of low-level signals from the power sourcing equipment via the communications channel, and (2) using the stream of low-level signals to charge the chargeable power storage device.

15. A powered device according to claim 13, wherein the use of the modulated power signals is a first communications mechanism serving as a backup to a distinct second communications mechanism serving as a primary communications mechanism between the power sourcing equipment and the powered device, the first communications mechanism being utilized when the primary communications mechanism is not available for use.

* * * * *